US012278385B2

(12) United States Patent
Sakamoto (10) Patent No.: US 12,278,385 B2
(45) Date of Patent: Apr. 15, 2025

(54) INTERLOCK STRUCTURE OF POWER SUPPLY SYSTEM

(71) Applicant: HONDA MOTOR CO., LTD., Tokyo (JP)

(72) Inventor: Hiroki Sakamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 653 days.

(21) Appl. No.: 17/676,834

(22) Filed: Feb. 22, 2022

(65) Prior Publication Data

US 2022/0302546 A1 Sep. 22, 2022

(30) Foreign Application Priority Data

Mar. 19, 2021 (JP) ................................. 2021-046409

(51) Int. Cl.
*H01M 50/249* (2021.01)
*H01M 50/204* (2021.01)
*H01M 50/264* (2021.01)

(52) U.S. Cl.
CPC ....... *H01M 50/249* (2021.01); *H01M 50/204* (2021.01); *H01M 50/264* (2021.01)

(58) Field of Classification Search
CPC . H01M 50/249; H01M 50/204; H01M 50/264
See application file for complete search history.

(56) References Cited

U.S. PATENT DOCUMENTS

| 2007/0284167 A1 | 12/2007 | Watanabe et al. |
| 2016/0160533 A1 | 6/2016 | Fujii |
| 2019/0326570 A1 | 10/2019 | Yoshinaga et al. |
| 2019/0359078 A1 | 11/2019 | Yamada et al. |

FOREIGN PATENT DOCUMENTS

| JP | 2006228526 A | 8/2006 |
| JP | 2013164993 A | 8/2013 |
| JP | 5683408 B2 | 3/2015 |
| JP | 2016025074 A | 2/2016 |
| JP | 2016109196 A | 6/2016 |
| JP | 2017169311 A | 9/2017 |
| JP | 2019192330 A | 10/2019 |
| JP | 2019205297 A | 11/2019 |
| WO | 2013021256 A2 | 2/2013 |

OTHER PUBLICATIONS

Notification of Reasons for Refusal issued Oct. 29, 2024 in the JP Patent Application No. 2021-046409.

*Primary Examiner* — Sarah A. Slifka
(74) *Attorney, Agent, or Firm* — CKC & Partners Co., LLC (57) ABSTRACT

A power supply system includes a first battery module 21, a second battery module 31, a first maintenance plug 7 that, when detached from the first battery module 21, isolates the first battery module 21 from a power circuit 5, a second maintenance plug 8 that, when detached from the second battery module 31, isolates the second battery module 31 from the power circuit 5, and a locking mechanism that locks the second maintenance plug 8. The first maintenance plug 7 includes an unlocking key for unlocking the second maintenance plug 8 locked by the locking mechanism.

14 Claims, 11 Drawing Sheets

INTERLOCK STRUCTURE OF POWER SUPPLY SYSTEM

This application is based on and claims the benefit of priority from Japanese Patent Application No. 2021-046409, filed on 19 Mar. 2021, the content of which is incorporated herein by reference.

BACKGROUND OF THE INVENTION

Field of the Invention

The present invention relates to an interlock structure of a power supply system. More specifically, the present invention relates to an interlock structure of a power supply system for an electric vehicle including two batteries.

Related Art

In recent years, much effort has been directed toward developing an electric vehicle such as electric transport equipment including a drive motor as a power generation source or a hybrid vehicle including a drive motor as a power generation source and an internal combustion engine. Such an electric vehicle is equipped with a battery for supplying electric energy to the drive motor. In recent years, an electric vehicle equipped with a plurality of batteries having different properties has been also developed. For example, Japanese Unexamined Patent Application, Publication No. 2017-describes an electric vehicle equipped with a high-output battery and a high-capacity battery.

For the electric vehicle equipped with the power source, it is required that the power source is isolated upon maintenance. For this reason, in many cases, a mechanism called an interlock for deactivating the apparatus as long as a predetermined condition is not satisfied is provided.

For example, Japanese Patent No. 5683408 describes an electric vehicle including a controller that controls a motor, a main battery that supplies power to the motor via the controller, a normally-open relay inserted into a power supply path from the main battery to the controller, and a sub-battery that supplies power to the relay. In the electric vehicle described in Japanese Unexamined Patent Application, Publication No. 2017-169311, a high-voltage terminal provided at a controller is covered with a terminal cover, and a sub-battery is arranged adjacent to the controller to interfere with attachment/detachment of the terminal cover. Thus, in the electric vehicle described in Japanese Unexamined Patent Application, Publication No. 2017-169311, the terminal cover cannot be detached and the high-voltage terminal cannot be operated as long as the sub-battery is not detached. After the sub-battery has been detached, a power supply path from a main battery to the controller is cut off.

Patent Document 1: Japanese Unexamined Patent Application, Publication No. 2017-169311
Patent Document 2: Japanese Patent No. 5683408

SUMMARY OF THE INVENTION

As described above, an interlock structure of the electric vehicle described in Japanese Patent No. 5683408 is based on an assumption that target apparatuses are arranged adjacent to each other, and for this reason, has a low degree of freedom in arrangement. For example, in the electric vehicle equipped with the plurality of batteries having the different properties as described in Japanese Unexamined Patent Application, Publication No. 2017-169311, the batteries are arranged at positions apart from each other in many cases, and for this reason, the interlock structure as described in Japanese Patent No. 5683408 cannot be applied to such an electric vehicle.

An object of the present invention is to provide an interlock structure of a power supply system for improving the degree of freedom in arrangement of two batteries while preventing the need to isolate the two batteries upon maintenance from being overlooked.

(1) The present invention is an interlock structure of a power supply system (e.g., a later-described power supply system 1) including a first battery (e.g., a later-described first battery module 21) and a second battery (e.g., a later-described second battery module 31). The power supply system includes a first isolator (e.g., a later-described first maintenance plug 7) that, when detached from the first battery, isolates the first battery from a power circuit (e.g., a later-described power circuit 5), a second isolator (e.g., a later-described second maintenance plug 8) that, when detached from the second battery, isolates the second battery from the power circuit, and a lock (e.g., a later-described locking mechanism 30) that locks the second isolator. The first isolator includes a lock releaser (e.g., a later-described unlocking key 75) that unlocks the second isolator locked by the lock.

(2) In this case, the lock preferably includes a cover (e.g., a later-described second cover 33) that covers the second isolator from the outside and a fixing member (e.g., a later-described lock clip 9) that fixes the cover to a case (e.g., a later-described second case 32) housing the second battery and the second isolator, and the lock releaser preferably includes a tool that detaches the fixing member.

(3) In this case, the fixing member preferably includes a lock-side recessed portion (e.g., a later-described lock-side recessed portion 981) in a shape recessed to the outside, and the lock releaser preferably includes an unlocking-side raised portion (e.g., a later-described unlocking-side raised portion 758) to be fitted in the lock-side recessed portion.

(4) In this case, the fixing member preferably includes a lock-side raised portion (e.g., a later-described lock-side raised portion 982) in a shape raised to the outside, and the lock releaser preferably includes an unlocking-side recessed portion (e.g., a later-described unlocking-side recessed portion 756) in which the lock-side raised portion is to be fitted.

(5) In this case, the fixing member preferably includes a lock-side recessed portion (e.g., the later-described lock-side recessed portion 981) in a shape recessed to the outside and a lock-side raised portion (e.g., the later-described lock-side raised portion 982) in a shape raised to the outside, and the lock releaser preferably includes an unlocking-side raised portion (e.g., the later-described unlocking-side raised portion 758) to be fitted in the lock-side recessed portion and an unlocking-side recessed portion (e.g., the later-described unlocking-side recessed portion 756) in which the lock-side raised portion is to be fitted in a state in which the unlocking-side raised portion is fitted in the lock-side recessed portion.

(6) In this case, the fixing member is preferably in a shaft shape, and any of the lock-side recessed portion and the lock-side raised portion is preferably formed at the center of an outer end portion (e.g., a later-described end surface 980) of the fixing member.

(7) In this case, the first battery preferably has a higher voltage than that of the second battery.

(1) In the interlock structure according to the present invention, the power supply system includes the first isolator that, when detached from the first battery, isolates the first battery from the power circuit, the second isolator that, when detached from the second battery, isolates the second battery from the power circuit, and the lock that locks the second isolator. The first isolator including the lock releaser that unlocks the second isolator locked by the lock. Thus, according to the present invention, a worker performing maintenance needs to use the lock releaser provided at the first isolator to unlock the second isolator locked by the lock. Thus, the worker cannot unlock the second isolator locked by the lock to detach the second isolator from the second battery as long as the first isolator is not detached from the first battery and the first battery is not isolated from the power circuit. This advantageous effect is not degraded even when the first battery and the second battery are provided at positions apart from each other. Thus, according to the present invention, the degree of freedom in arrangement of the first battery and the second battery can be improved while preventing the need to detach the first and second isolators, i.e., preventing the need to isolate the first and second batteries, upon maintenance from being overlooked.

(2) In the interlock structure according to the present invention, the lock includes the cover that covers the second isolator from the outside and the fixing member that fixes the cover to the case housing the second battery and the second isolator, and the lock releaser includes the tool that detaches the fixing member. Thus, according to the present invention, by way of a simple configuration, it is possible to prevent isolation of the first and second batteries from being overlooked.

(3) In the interlock structure according to the present invention, the fixing member includes the lock-side recessed portion in the shape recessed to the outside, and the lock releaser includes the unlocking-side raised portion to be fitted in the lock-side recessed portion. Thus, according to the present invention, the configurations of the fixing member and the lock releaser that detaches the fixing member can be simplified.

(4) In the interlock structure according to the present invention, the fixing member includes the lock-side raised portion in the shape raised to the outside, and the lock releaser includes the unlocking-side recessed portion in which the lock-side raised portion is to be fitted. Thus, according to the present invention, the configurations of the fixing member and the lock releaser that detaches the fixing member can be simplified.

(5) In the interlock structure according to the present invention, the fixing member includes the lock-side recessed portion and the lock-side raised portion, and the lock releaser includes the unlocking-side raised portion to be fitted in the lock-side recessed portion and the unlocking-side recessed portion in which the lock-side raised portion is to be fitted in a state in which the unlocking-side raised portion is fitted in the lock-side recessed portion. Thus, according to the present invention, the lock releaser and the fixing member can be fitted in each other at two points, i.e., the unlocking-side raised portion and the unlocking-side recessed portion, and therefore, the fixing member can be easily detached using the lock releaser.

(6) In the interlock structure according to the present invention, any of the lock-side recessed portion and the lock-side raised portion is formed at the center of the outer end portion of the shaft-shaped fixing member. Thus, according to the present invention, the fixing member can be easily rotated in such a manner that the lock releaser is rotated about an axis passing through the center of the fixing member while the lock releaser and the fixing member are fitted in each other at the two points, i.e., the unlocking-side raised portion and the unlocking-side recessed portion.

(7) In the interlock structure according to the present invention, the first battery has a higher voltage than that of the second battery. Thus, according to the present invention, a situation where the lower-voltage second battery is isolated, but the higher-voltage first battery is not isolated can be prevented.

DETAILED DESCRIPTION OF THE INVENTION

Figure 1:
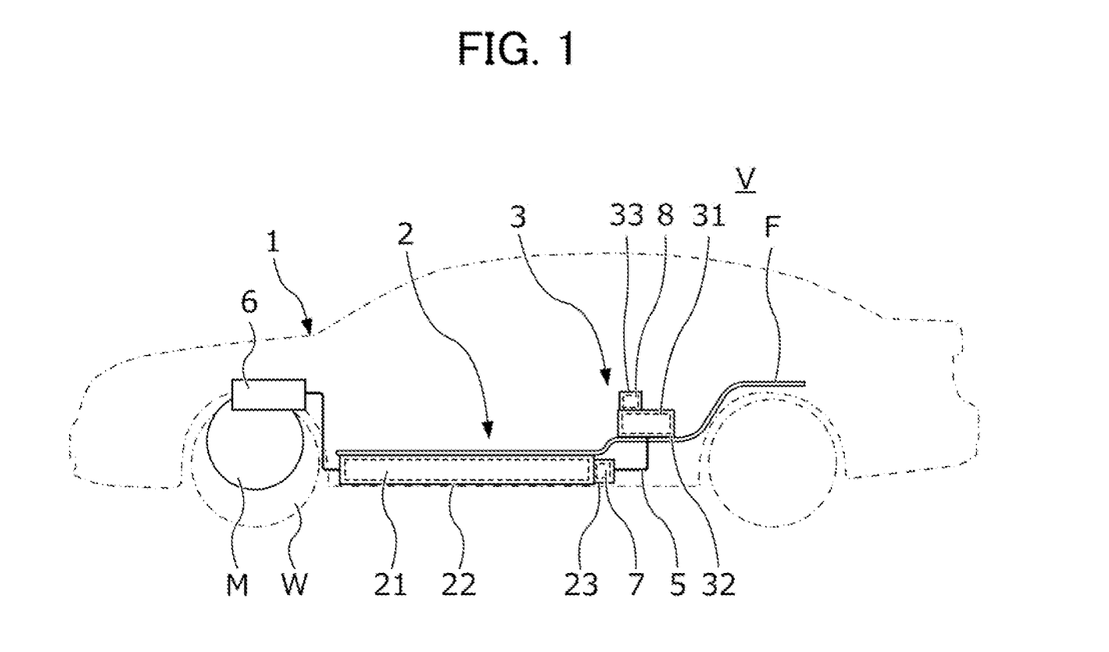
FIG. 1 is a view showing the configuration of a power supply system including an interlock structure according to one embodiment of the present invention and the configuration of an electric vehicle equipped with the power supply system.

Hereinafter, one embodiment of the present invention will be described with reference to the drawings. FIG. 1 is a view showing the configuration of a power supply system 1 including an interlock structure according to the present embodiment and the configuration of an electric vehicle V equipped with the power supply system 1.

The electric vehicle V is a front-wheel-drive vehicle including front wheels W as drive wheels and a drive motor M coupled to the front wheels W. The power supply system 1 includes a first battery unit 2, a second battery unit 3, a power circuit 5 connecting these battery units 2, 3 and the drive motor M to each other, and a power control unit 6 having, e.g., plural types of electric equipment such as an inverter and a DC-DC converter connected to the power circuit 5 and a control apparatus that operates such electric equipment to control the flow of power in the power circuit 5.

The first battery unit 2 is provided below the floor substantially in the center along a traveling direction of the electric vehicle V, i.e., below a floor panel F dividing the inside and outside of a vehicle compartment from each other.

The second battery unit 3 is provided on the rear side with respect to the first battery unit 2 along the traveling direction of the electric vehicle V in the vehicle compartment, i.e., above the floor panel F. That is, the first battery unit 2 and the second battery unit 3 are provided at positions apart from each other through the floor panel F.

Figure 2:
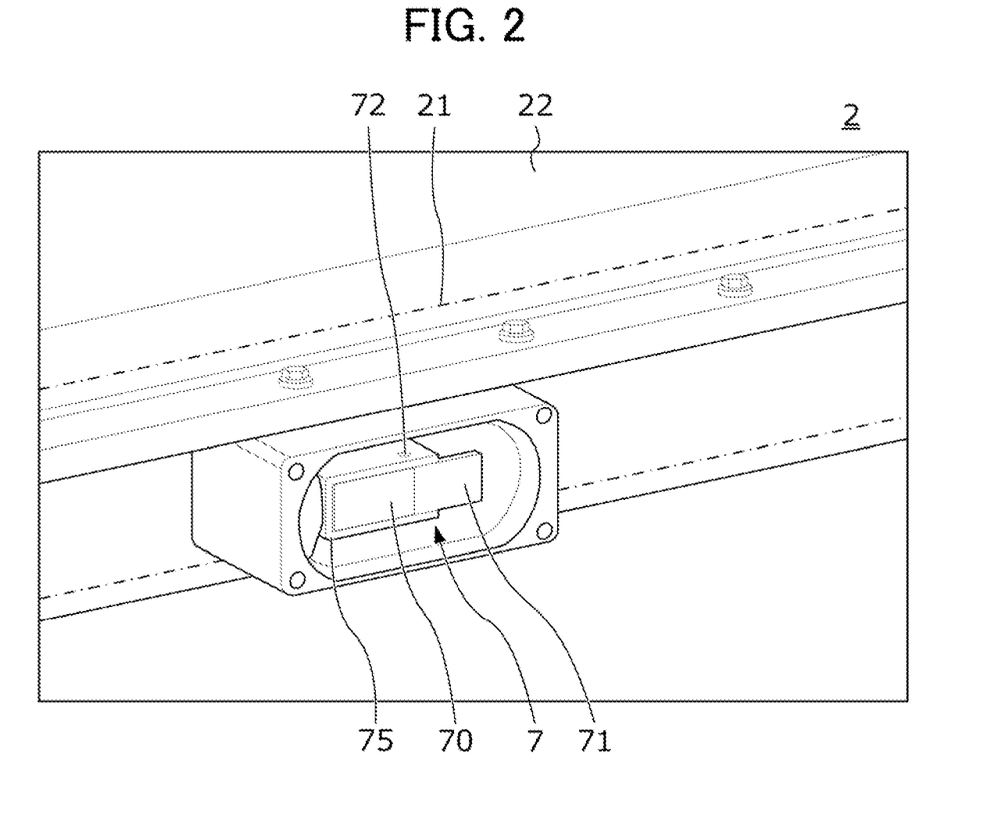
FIG. 2 is a perspective view of a first battery unit from a vehicle rear side.

FIG. 2 is a perspective view of the first battery unit 2 from the vehicle rear side. The first battery unit 2 includes a first battery module 21 as a first battery formed such that a plurality of battery cells are stacked on each other, a first maintenance plug 7 as a first isolating apparatus connected to the first battery module 21, a first case 22 housing the first battery module 21 and the first maintenance plug 7, and a first cover 23 (see FIG. 1) fixed to the first case 22 to cover the first maintenance plug 7 from the outside. Note that for the sake of easy understanding, FIG. 2 shows a state in which the first cover 23 is detached from the first case 22 and the first maintenance plug 7 connected to the first battery module 21 is exposed to the outside.

The first maintenance plug 7 is an isolating apparatus for reliably isolating the first battery module 21 from the power circuit 5. In a state in which the first maintenance plug 7 is connected to the first battery module 21, the first battery module 21 and the power circuit 5 are in conduction with each other. When the first maintenance plug 7 is detached from the first battery module 21, the first battery module 21 is isolated from the power circuit 5. Thus, when a worker performs maintenance for the electric vehicle V, the worker needs to detach the first maintenance plug 7 from the first battery module 21 to isolate the first battery module 21 and the power circuit 5 from each other.

Figure 3:
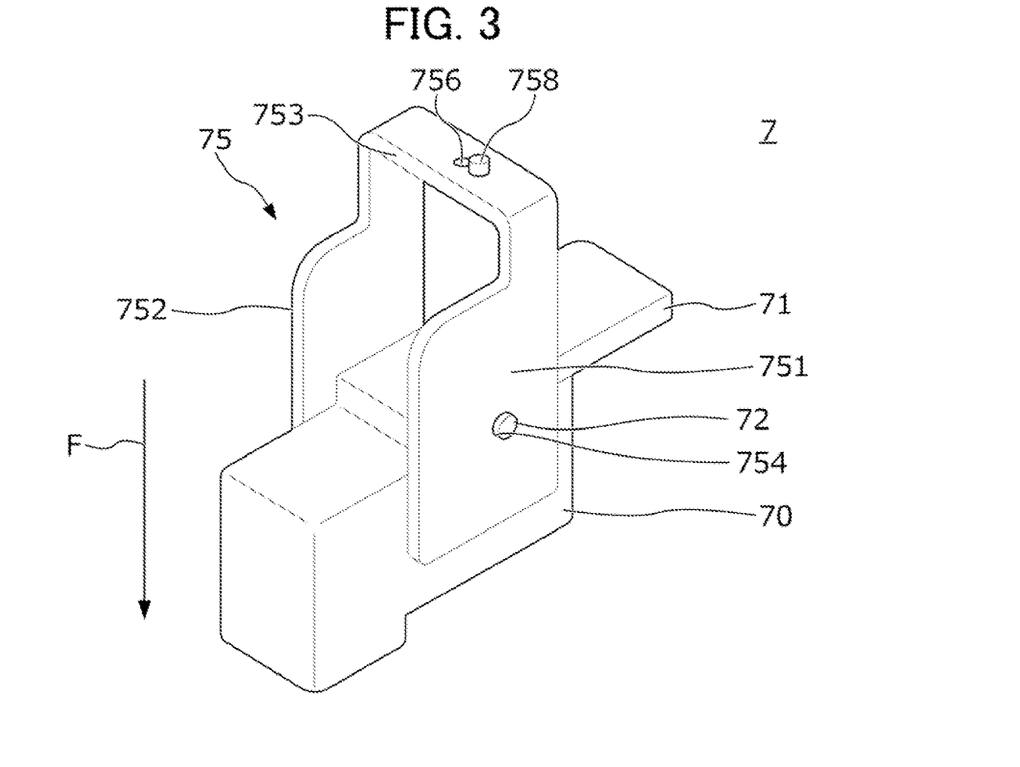
FIG. 3 is a perspective view showing the configuration of a first maintenance plug.

FIG. 3 is a perspective view showing the configuration of the first maintenance plug 7. More specifically, FIG. 3 shows a perspective view of the first maintenance plug 7 from the outside of the first case 22.

The first maintenance plug 7 includes a quadrangular prism-shaped plug body 70 extending along an insertion direction F, a plate-shaped gripping portion 71 provided outside the plug body 70 and extending in a direction perpendicular to the insertion direction F, and an unlocking key 75 as an unlocking mechanism provided at the plug body 70.

The worker presses in the gripping portion 71 along the insertion direction F in a state in which the inside of the plug body 70 faces the first battery module 21, i.e., a state in which the gripping portion 71 faces the worker, thereby connecting the first maintenance plug 7 to the first battery module 21 such that the first battery module 21 and the power circuit 5 are in conduction with each other. The worker grips the gripping portion 71 to pull the gripping portion 71 in the opposite detachment direction of the insertion direction F, thereby detaching the first maintenance plug 7 from the first battery module 21 such that the first battery module 21 is isolated from the power circuit 5.

The unlocking key 75 includes a tool for unlocking a second maintenance plug 8 locked by a locking mechanism 30 as described later. More specifically, the unlocking key 75 includes a tool for detaching a later-described lock clip 9 forming the locking mechanism 30.

The unlocking key 75 includes plate-shaped side portions 751, 752 extending along both side surfaces of the plug body 70 and a plate-shaped center portion 753 connecting these side portions 751, 752 to each other. A support shaft 72 extending in a direction perpendicular to the insertion direction F between both side surfaces of the plug body 70 is fitted in holes 754 formed on a base end side at the side portions 751, 752, and in this manner, the unlocking key 75 is provided turnably about the support shaft 72 relative to the plug body 70. Note that FIG. 2 shows a state in which the unlocking key 75 is laid down on the plug body 70 and FIG. 3 shows a state in which the unlocking key 75 stands on the plug body 70.

Figure 4A:
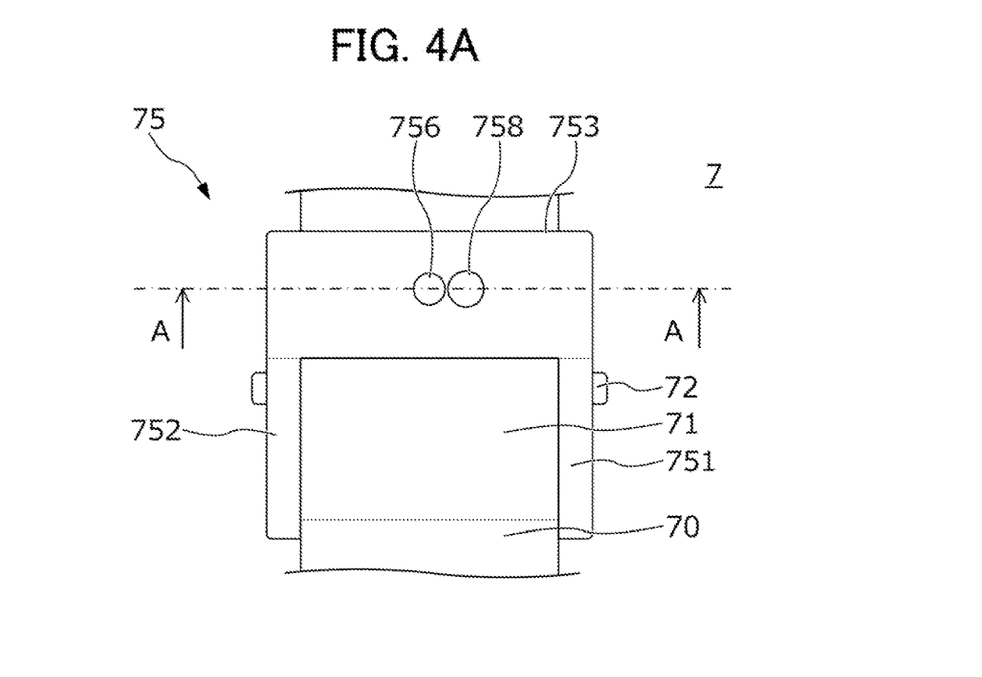
FIG. 4A is a front view of an unlocking key from a tip end side.
Figure 4B:
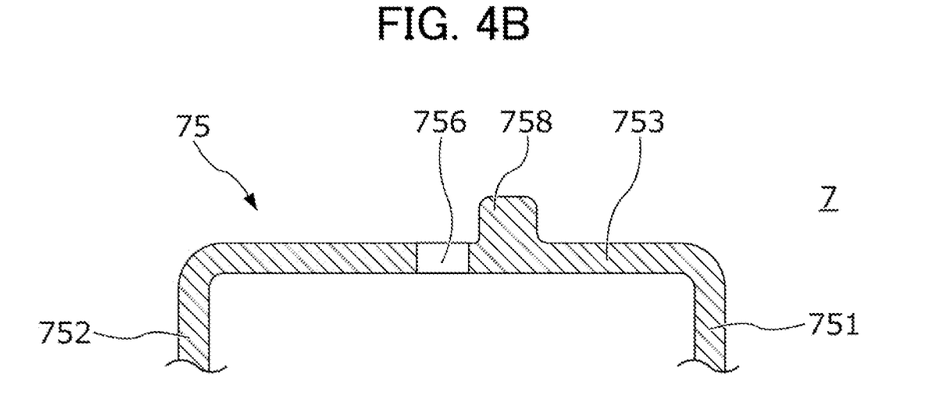
FIG. 4B is a sectional view of the unlocking key along a line A-A.

FIG. 4A is a front view of the unlocking key 75 from a tip end side, and FIG. 4B is a sectional view of the unlocking key 75 along a line A-A.

As shown in FIGS. 4A and 4B, an unlocking-side recessed portion 756 formed in a recessed shape as viewed in section and an unlocking-side raised portion 758 formed in a raised shape as viewed in section are formed on the tip end side of the center portion 753. The unlocking-side recessed portion 756 is formed at the substantially center of the center portion 753 in a width direction, and the unlocking-side raised portion 758 is formed outside the unlocking-side recessed portion 756 in the width direction at the center portion 753.

Figure 5:
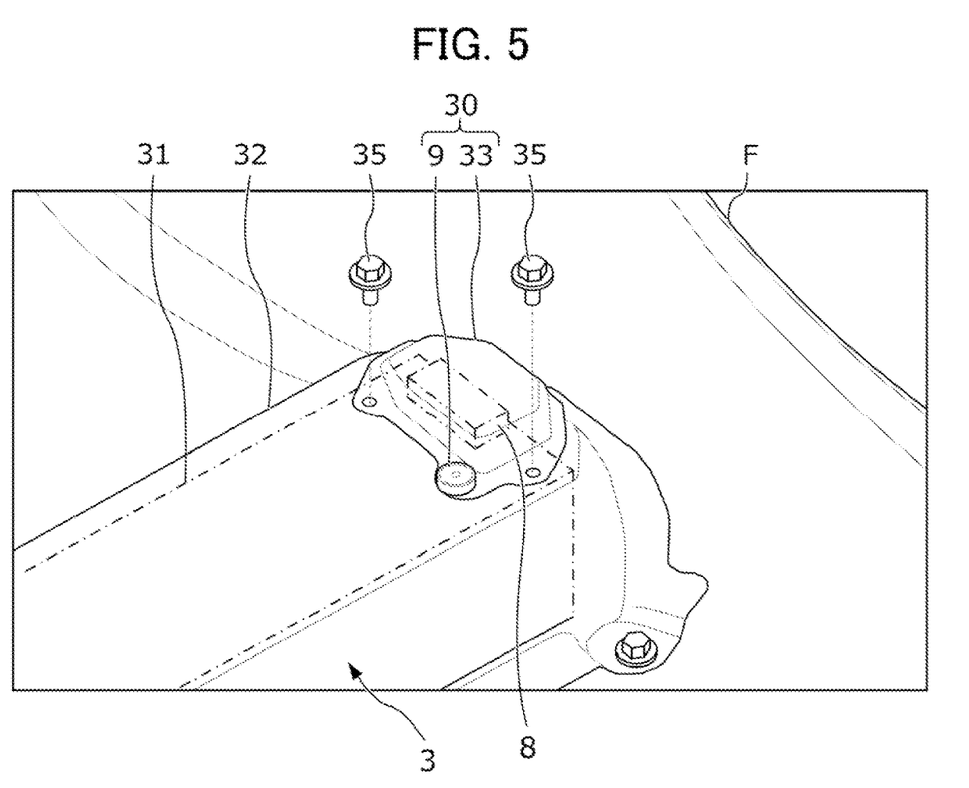
FIG. 5 is a perspective view of a second battery unit in a vehicle compartment from above.

FIG. 5 is a perspective view of the second battery unit 3 inside the vehicle compartment from above. The second battery unit 3 includes a second battery module 31 as a second battery formed such that a plurality of battery cells are stacked on each other, a second maintenance plug 8 as a second isolating apparatus connected to the second battery module 31, a second case 32 housing the second battery module 31 and the second maintenance plug 8, a second cover 33 fixed to the second case 32 to cover the second maintenance plug 8 from the outside, the lock clip 9 as a fixing member fixing the second cover 33 to the second case 32, and a plurality of bolts 35 fixing the second cover 33 to the second case 32. Note that for the sake of easy understanding, FIG. 5 shows a state in which the second cover 33 is fixed to the second case 32 with the lock clip 9 such that the second maintenance plug 8 is covered from the outside by the second cover 33.

The first battery module 21 has a lower gravimetric output density, a higher gravimetric energy density, a greater capacity, and a higher output voltage than those of the second battery module 31. That is, the first battery module 21 is a capacitive secondary battery mainly for a high capacity, and the second battery module 31 is an output secondary battery mainly for a high output.

The second maintenance plug 8 is an isolating apparatus for reliably isolating the second battery module 31 from the power circuit 5. In a state in which the second maintenance plug 8 is connected to the second battery module 31, the second battery module 31 and the power circuit 5 are in conduction with each other. When the second maintenance plug 8 is detached from the second battery module 31, the second battery module 31 is isolated from the power circuit 5. Thus, when the worker performs maintenance for the electric vehicle V, the worker needs to detach the second maintenance plug 8 from the second battery module 31 to isolate the second battery module 31 and the power circuit 5 from each other.

As shown in FIG. 5, the second cover 33 is fixed to the second case 32 with the bolts 35 and the lock clip 9, thereby isolating the second maintenance plug 8 connected to the second battery module 31 from the outside. That is, in a state in which the second cover 33 is fixed to the second case 32, the worker can neither operate the second maintenance plug 8 nor detach the second maintenance plug 8 from the second battery module 31. The bolt 35 can be detached by a general tool such as a wrench or a spanner, and on the other hand, the lock clip 9 can be detached from the second cover 33 only with the above-described unlocking key 75. Thus, in the present embodiment, the locking mechanism 30 that locks the second maintenance plug 8 with the second maintenance plug 8 being connected to the second battery module 31 includes the second cover 33 and the lock clip 9.

Figure 6:
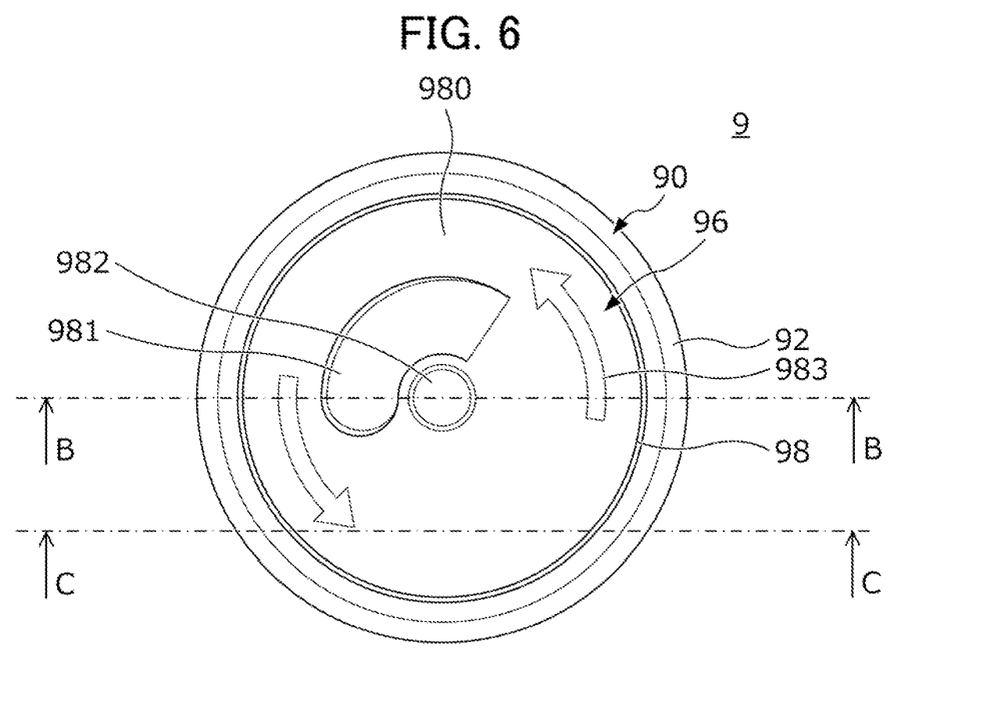
FIG. 6 is a plan view of a lock clip from the outside.
Figure 7:
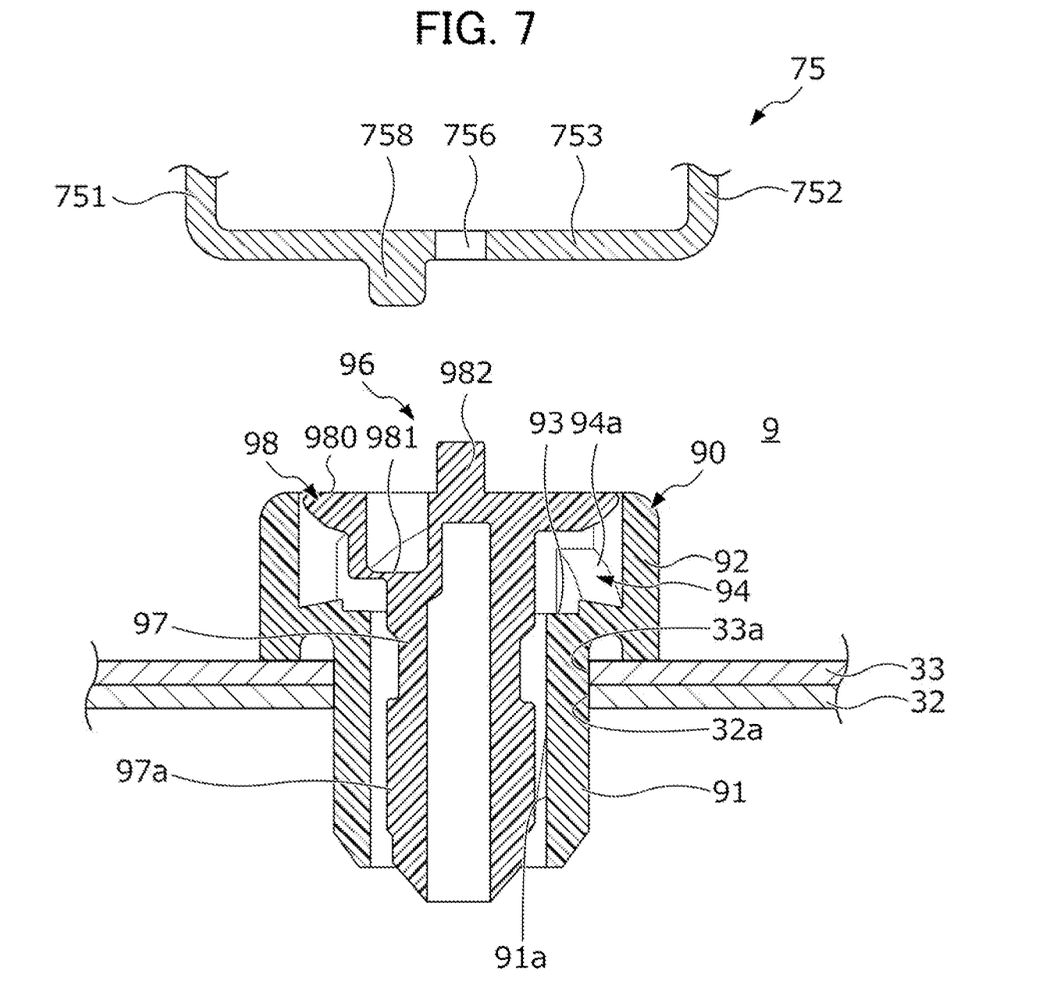
FIG. 7 is a sectional view of the lock clip along a line B-B.
Figure 8A:
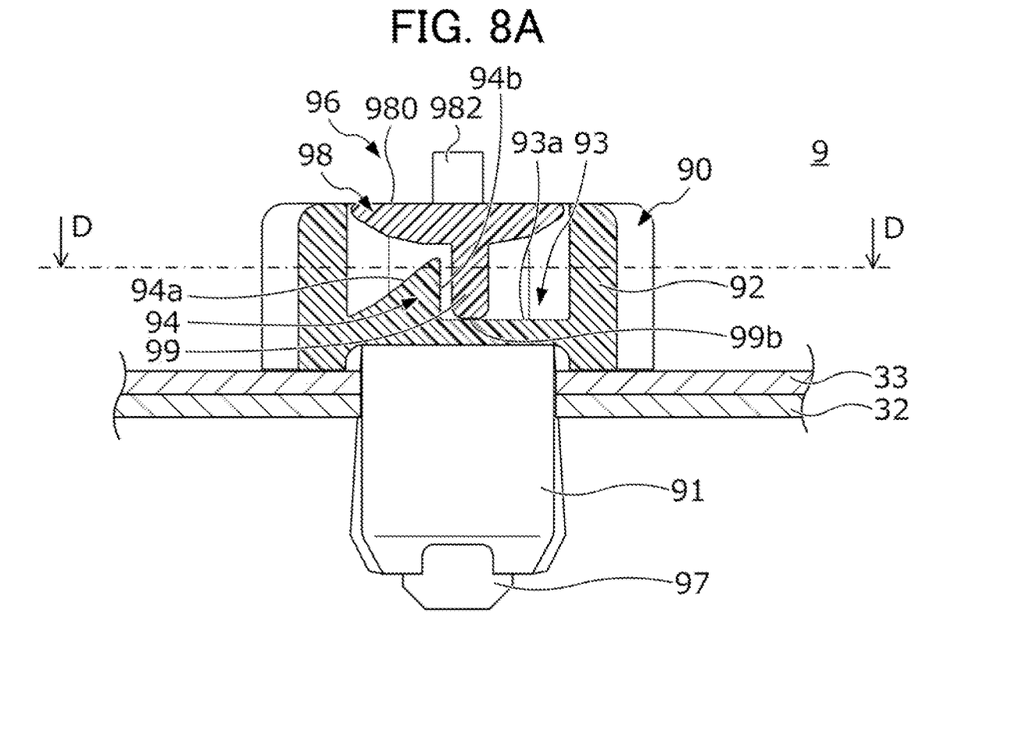
FIG. 8A is a sectional view of the lock clip along a line C-C.
Figure 8B:
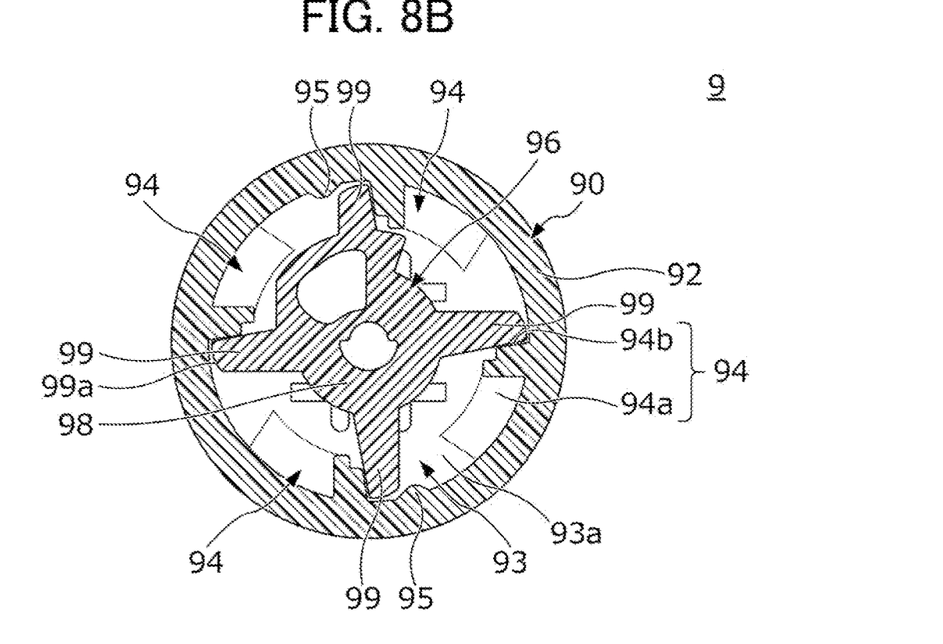
FIG. 8B is a sectional view of the lock clip along a line D-D.

FIG. 6 is a plan view of the lock clip 9 from the outside. FIG. 7 is a sectional view of the lock clip 9 along a line B-B. FIG. 8A is a sectional view of the lock clip 9 along a line C-C. FIG. 8B is a sectional view of the lock clip 9 along a line D-D.

The lock clip 9 includes a tubular grommet 90 to be inserted into a through-hole 32a formed at the second case 32 and a through-hole 33a formed at the second cover 33 and a shaft-shaped lock pin 96 to be inserted into the grommet 90.

The grommet 90 is, for example, made of resin. The grommet 90 includes a cylindrical portion 91 to be inserted into the through-holes 32a, 33a and a large-diameter cylindrical portion 92 having larger inner and outer diameters than those of the cylindrical portion 91.

A portion of the cylindrical portion 91 on the tip end side inside the second case 32 is divided into plural portions in a circumferential direction. Thus, the lock pin 96 is inserted into the cylindrical portion 91 to push an inner wall surface 91a of the cylindrical portion 91 outwardly in a radial direction, and in this manner, the diameter of the tip end side of the cylindrical portion 91 can be expanded (see FIG. 8A).

Of the large-diameter cylindrical portion 92, a bottom portion on the tip end side forms a seating portion 93 on which the lock pin 96 is seated. As shown in FIG. 8B, the seating portion 93 is in a circular ring shape as viewed along the axis of the lock pin 96. The seating portion 93 is formed with a plurality (e.g., four) of guide portions 94 at equal intervals along the circumferential direction. The guide portion 94 is in a shape raised to the base end side as viewed in section. The guide portion 94 includes an inclined surface 94a inclined such that a height along the axis increases in a clockwise direction as viewed from the base end side and a stopper surface 94b extending along the axis.

An inner wall surface of the large-diameter cylindrical portion 92 is formed with a plurality (e.g., two) of protruding portions 95 at equal intervals along the circumferential direction. The protruding portions 95 are provided at positions slightly apart from the stopper surfaces 94b of the guide portions 94 in the clockwise direction as viewed from the base end side along the circumferential direction. The protruding portion 95 is in a shape raised inwardly in the radial direction as viewed in section (see FIG. 8B).

The lock pin 96 includes a shaft-shaped shaft portion 97 and a discoid dish portion 98 provided on the base end side of the shaft portion 97.

On the tip end side of the shaft portion 97, an expanded-diameter portion 97a in a shape raised outwardly in the radial direction as viewed in section is formed. The outer diameter of the expanded-diameter portion 97a is slightly larger than the inner diameter of the inner wall surface 91a of the grommet 90. Thus, the shaft portion 97 is inserted into the cylindrical portion 91 of the grommet 90 so that the diameter of the cylindrical portion 91 on the tip end side can be expanded (see FIG. 8A).

As shown in FIGS. 8A and 8B, a plurality (e.g., the same number as that of the guide portions 94) of plate-shaped slide plates 99 is provided at equal intervals along the circumferential direction at a base-end-side outer peripheral portion of the shaft portion 97. The slide plates 99 extend outwardly in the radial direction from the outer peripheral portion of the shaft portion 97. As shown in FIG. 8B, in a state in which the shaft portion 97 is inserted into the cylindrical portion 91 of the grommet 90, outer end portions 99a of the slide plates 99 in the radial direction slidably contact the inner wall surface of the large-diameter cylindrical portion 92. As shown in FIG. 8A, the lock pin 96 can be inserted into the cylindrical portion 91 of the grommet 90 until tip-end-side edge portions 99b of the slide plates 99 contact a flat surface 93a of the seating portion 93 of the large-diameter cylindrical portion 92.

The dish portion 98 is provided in a flange shape on the base end side of the shaft portion 97. On a tip-end-side surface of the dish portion 98, the above-described plurality of slide plates 99 is provided at equal intervals along the circumferential direction. At a base-end-side end surface 980 of the dish portion 98, i.e., the end surface 980 outside the second case 32 when the lock clip 9 is attached to the second case 32 and the second cover 33, a lock-side recessed portion 981 formed in a shape recessed to the outside, a lock-side raised portion 982 in a shape raised to the outside, and arrows 983 indicating an operation direction upon detachment of the lock clip 9 are formed.

As shown in FIG. 8A, in a state in which the lock pin 96 is inserted into the cylindrical portion 91 until the edge portions 99b of the slide plates 99 of the lock pin 96 contact the flat surface 93a of the seating portion 93, the end surface 980 of the dish portion 98 is flush with a base-end-side end surface of the large-diameter cylindrical portion 92 of the grommet 90. As shown in FIG. 6, the direction of the arrows 983, i.e., the operation direction upon detachment of the lock clip 9, is in the counterclockwise direction as viewed from the outside.

The lock-side raised portion 982 is formed at the center of the circular end surface 980 as viewed in plane. As shown in FIG. 7, the lock-side raised portion 982 is fitted in the unlocking-side recessed portion 756 formed at the unlocking key 75.

The lock-side recessed portion 981 is formed slightly outside the lock-side raised portion 982 in the radial direction at the end surface 980. The lock-side recessed portion 981 is in an arc shape as viewed in plane, and becomes deeper in the counterclockwise direction as viewed from the outside. As shown in FIG. 7, the unlocking-side raised portion 758 formed at the unlocking key 75 is fitted in the lock-side recessed portion 981. A clearance between the lock-side raised portion 982 and the lock-side recessed portion 981 along the radial direction is the same as a clearance between the unlocking-side recessed portion 756 and the unlocking-side raised portion 758 of the unlocking key 75 along the width direction. Thus, as shown in FIG. 7, in a state in which the unlocking-side raised portion 758 of the unlocking key 75 is fitted in the lock-side recessed portion 981 of the lock clip 9, the lock-side raised portion 982 can be simultaneously fitted in the unlocking-side recessed portion 756. Thus, the worker can rotate the unlocking key 75 in the operation direction indicated by the arrows 983 in a state in which the unlocking-side raised portion 758 of the unlocking key 75 is fitted in the lock-side recessed portion 981 and the lock-side raised portion 982 is fitted in the unlocking-side recessed portion 756 of the unlocking key 75, thereby rotating the lock pin 96.

Next, the steps of attaching the lock clip 9 to the second case 32 and the second cover 33 will be described with reference to FIGS. 8A and 8B.

First, the worker inserts the cylindrical portion 91 of the grommet 90 into the through-hole 32a of the second case 32 and the through-hole 33a of the second cover 33. Thereafter, the shaft portion 97 is inserted into the cylindrical portion 91 until the edge portions 99b of the slide plates 99 of the lock pin 96 contact the flat surface 93a of the grommet 90.

Accordingly, the diameter of the cylindrical portion 91 of the grommet 90 is expanded, and the lock clip 9 is fixed to the second case 32 and the second cover 33. By such insertion of the lock pin 96 into the grommet 90, each slide plate 99 of the lock pin 96 is sandwiched from both sides in the circumferential direction by the stopper surface 94*b* and the protruding portion 95 of the grommet 90 as shown in FIG. 8B, and therefore, movement along the circumferential direction is restricted. With this configuration, detachment of the lock pin 96 from the grommet 90 due to vibration can be prevented.

Next, the steps of detaching the lock clip 9 by means of the unlocking key 75 will be described with reference to FIGS. 9A, 9B, 10A, 10B, 11A, and 11B.

Figure 9A:
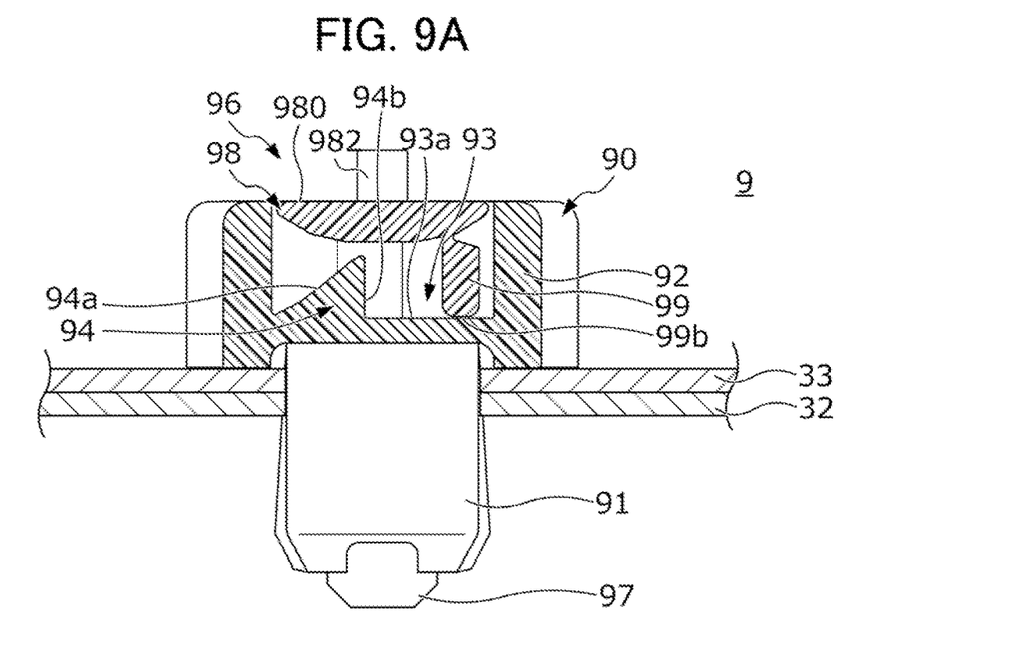
FIG. 9A is a sectional view of the lock clip along the line C-C.
Figure 9B:
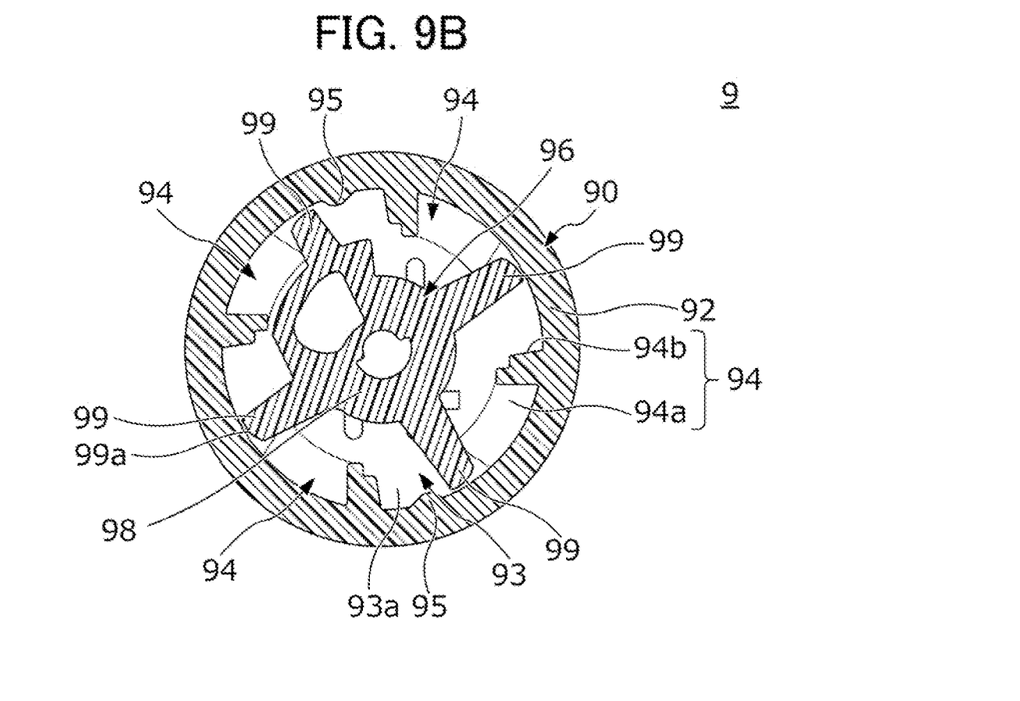
FIG. 9B is a sectional view of the lock clip along the line D-D.
Figure 10A:
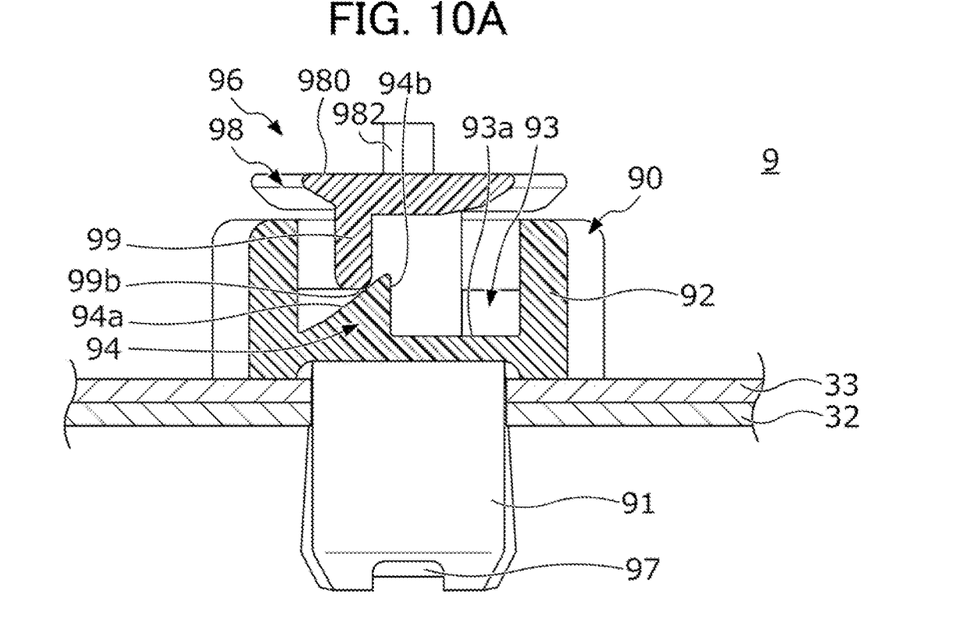
FIG. 10A is a sectional view of the lock clip along the line C-C.
Figure 10B:
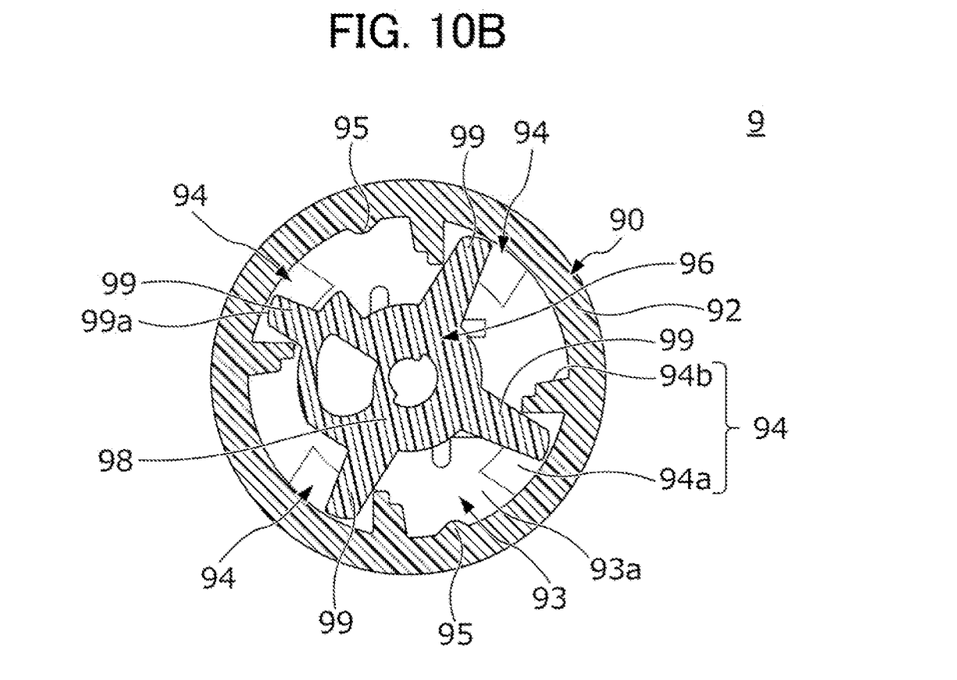
FIG. 10B is a sectional view of the lock clip along the line D-D.
Figure 11A:
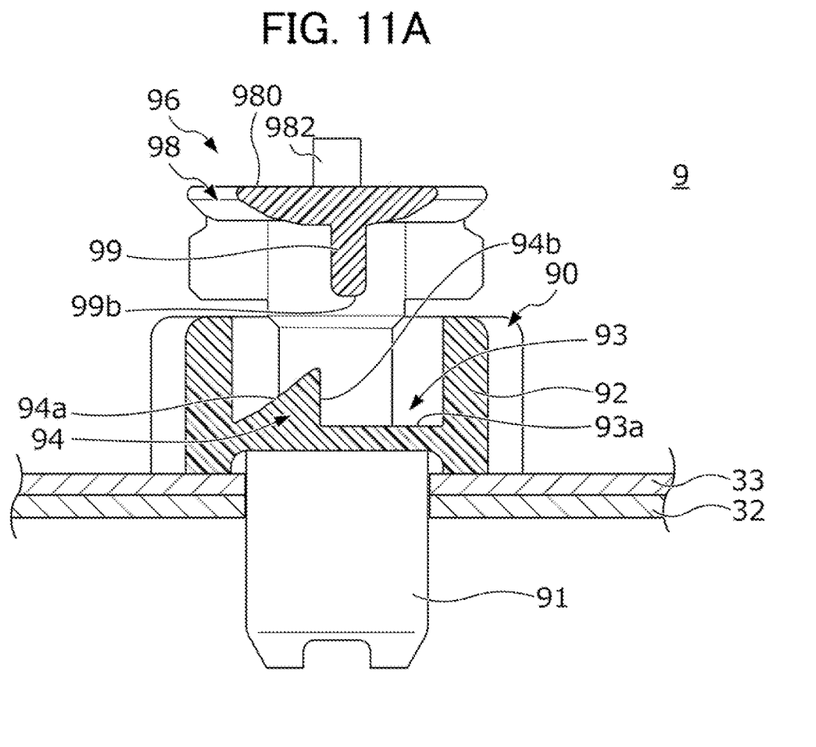
FIG. 11A is a sectional view of the lock clip along the line C-C.
Figure 11B:
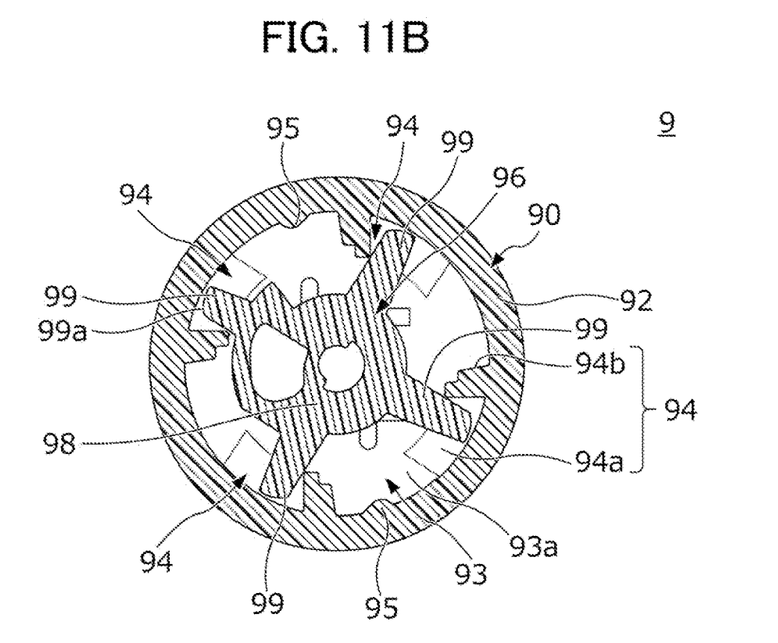
FIG. 11B is a sectional view of the lock clip along the line D-D.

FIGS. 9A, 10A, and 11A are sectional views of the lock clip 9 along the line C-C, and FIGS. 9B, 10B, and 11B are sectional views of the lock clip 9 along the line D-D.

First, the worker prepares the unlocking key 75 including the tool necessary for detaching the lock clip 9. As described above, the unlocking key 75 is provided at the first maintenance plug 7. Thus, the worker opens the first cover 23 of the first battery unit 2 and detaches the first maintenance plug 7 from the first battery module 21, thereby preparing the unlocking key 75.

Next, the worker rotates the unlocking key 75 in the counterclockwise direction as viewed from the worker after the unlocking-side raised portion 758 of the unlocking key 75 has been fitted in the lock-side recessed portion 981 and the lock-side raised portion 982 has been fitted in the unlocking-side recessed portion 756 of the unlocking key 75. As described with reference to FIG. 8B, counterclockwise movement of each slide plate 99 of the lock pin 96 is restricted by the protruding portion 95 of the grommet 90. Thus, the worker rotates the unlocking key 75 in the counterclockwise direction under a torque of equal to or greater than a predetermined amount until each slide plate 99 moves over a corresponding one of the protruding portions 95, as shown in FIGS. 9A and 9B.

Thereafter, when the unlocking key 75 is further rotated in the counterclockwise direction, the edge portion 99*b* of each slide plate 99 of the lock pin 96 slidably contacts the inclined surface 94*a* of the grommet 90 and the lock pin 96 is lifted to a worker side, as shown in FIGS. 10A and 10B.

Thereafter, the worker picks the dish portion 98 of the lifted lock pin 96 with fingers, and pulls the lock pin 96 out of the grommet 90. In this manner, the diameter of the cylindrical portion 91 of the grommet 90 is narrowed as shown in FIGS. 11A and 11B, and therefore, the grommet 90 can be pulled out of the through-holes 32*a*, 33*a*.

According to the interlock structure of the power supply system 1 of the present embodiment, the following advantageous effects are provided.

(1) The power supply system 1 includes the first maintenance plug 7 that, when detached from the first battery module 21, isolates the first battery module 21 from the power circuit 5, the second maintenance plug 8 that, when detached from the second battery module 31, isolates the second battery module 31 from the power circuit 5, and the locking mechanism 30 that locks the second maintenance plug 8. The first maintenance plug 7 includes the unlocking key 75 for unlocking the second maintenance plug 8 locked by the locking mechanism 30. Thus, according to the present embodiment, the worker performing maintenance needs to use the unlocking key 75 provided at the first maintenance plug 7 to unlock the second maintenance plug 8 locked by the locking mechanism 30. Thus, the worker cannot unlock the second maintenance plug 8 locked by the locking mechanism 30 to detach the second maintenance plug 8 from the second battery module 31 as long as the first maintenance plug 7 is not detached from the first battery module 21 and the first battery module 21 is not isolated from the power circuit 5. This advantageous effect is not impaired even if the first battery module 21 and the second battery module 31 are provided at positions apart from each other through the floor panel F. Thus, according to the present embodiment, the degree of freedom in arrangement of the first battery module 21 and the second battery module 31 can be improved while a failure to detach the maintenance plugs 7, 8, i.e., a failure to isolate the battery modules 21, 31, upon maintenance can be prevented.

(2) The locking mechanism 30 includes the second cover 33 that isolates the second maintenance plug 8 from the outside and the lock clip 9 that fixes the second cover 33 to the second case 32 housing the second battery module 31 and the second maintenance plug 8, and the unlocking key 75 includes the tool for detaching the lock clip 9. Thus, according to the present embodiment, by way of a simple configuration, it is possible to prevent isolation of the battery modules 21, 31 from being overlooked.

(3) The lock pin 96 of the lock clip 9 includes the lock-side recessed portion 981, and the unlocking key 75 includes the unlocking-side raised portion 758 to be fitted in the lock-side recessed portion 981. Thus, according to the present embodiment, the configurations of the lock clip 9 and the unlocking key 75 for detaching the lock clip 9 can be simplified.

(4) The lock pin 96 of the lock clip 9 includes the lock-side raised portion 982, and the unlocking key 75 includes the unlocking-side recessed portion 756 in which the lock-side raised portion 982 is to be fitted. Thus, according to the present embodiment, the configurations of the lock clip 9 and the unlocking key 75 for detaching the lock clip 9 can be simplified.

(5) The lock pin 96 of the lock clip 9 includes the lock-side recessed portion 981 and the lock-side raised portion 982, and the unlocking key 75 includes the unlocking-side raised portion 758 to be fitted in the lock-side recessed portion 981 and the unlocking-side recessed portion 756 in which the lock-side raised portion 982 is to be fitted in a state in which the unlocking-side raised portion 758 is fitted in the lock-side recessed portion 981. Thus, according to the present embodiment, the unlocking key 75 and the lock pin 96 can be fitted in each other at two points, i.e., the unlocking-side raised portion 758 and the unlocking-side recessed portion 756, and therefore, the lock clip 9 can be easily detached using the unlocking key 75.

(6) The lock-side raised portion 982 is formed at the center of the outer end surface 980 of the shaft-shaped lock pin 96. Thus, according to the present embodiment, the lock pin 96 can be easily rotated in such a manner that the unlocking key 75 is rotated about an axis passing through the center of the lock pin 96 while the unlocking key 75 and the lock pin 96 are fitted in each other at the two points, i.e., the unlocking-side raised portion 758 and the unlocking-side recessed portion 756.

(7) The first battery module 21 has a higher voltage than that of the second battery module 31. Thus, according to the present embodiment, a situation where the lower-voltage second battery module 31 is isolated, but the higher-voltage first battery module 21 is not isolated can be prevented.

One embodiment of the present invention has been described above, but the present invention is not limited to such an embodiment. The details of the configuration may be changed as necessary within the scope of the gist of the present invention. For example, in the above-described embodiment, the case where the lock-side raised portion 982 is formed at the center of the end surface 980 of the lock pin 96 has been described, but the present invention is not limited to such a case. A lock-side recessed portion in a shape recessed to the outside may be formed at the center of the end surface 980 of the lock pin 96, and a lock-side raised portion in a shape raised to the outside may be formed at a position apart from the lock-side recessed portion slightly outwardly in the radial direction.

What is claimed is:

1. An interlock structure of a power supply system including a first battery and a second battery,
   the power supply system including
   a first isolator that, when detached from the first battery, isolates the first battery from a power circuit,
   a second isolator that, when detached from the second battery, isolates the second battery from the power circuit, and
   a lock that locks the second isolator,
   the first isolator including a lock releaser that unlocks the second isolator locked by the lock.

2. The interlock structure of the power supply system according to claim 1, wherein
   the lock includes a cover that covers the second isolator from an outside and a fixing member that fixes the cover to a case housing the second battery and the second isolator, and
   the lock releaser includes a tool that detaches the fixing member.

3. The interlock structure of the power supply system according to claim 2, wherein
   the fixing member includes a lock-side recessed portion in a shape recessed to the outside, and
   the lock releaser includes an unlocking-side raised portion to be fitted in the lock-side recessed portion.

4. The interlock structure of the power supply system according to claim 3, wherein
   the fixing member includes a lock-side raised portion in a shape raised to the outside, and
   the lock releaser includes an unlocking-side recessed portion in which the lock-side raised portion is to be fitted.

5. The interlock structure of the power supply system according to claim 4, wherein the first battery has a higher voltage than that of the second battery.

6. The interlock structure of the power supply system according to claim 3, wherein the first battery has a higher voltage than that of the second battery.

7. The interlock structure of the power supply system according to claim 2, wherein
   the fixing member includes a lock-side raised portion in a shape raised to the outside, and
   the lock releaser includes an unlocking-side recessed portion in which the lock-side raised portion is to be fitted.

8. The interlock structure of the power supply system according to claim 7, wherein the first battery has a higher voltage than that of the second battery.

9. The interlock structure of the power supply system according to claim 2, wherein
   the fixing member includes a lock-side recessed portion in a shape recessed to the outside and a lock-side raised portion in a shape raised to the outside, and
   the lock releaser includes an unlocking-side raised portion to be fitted in the lock-side recessed portion and an unlocking-side recessed portion in which the lock-side raised portion is to be fitted in a state in which the unlocking-side raised portion is fitted in the lock-side recessed portion.

10. The interlock structure of the power supply system according to claim 9, wherein
    the fixing member is in a shaft shape, and
    any of the lock-side recessed portion and the lock-side raised portion is formed at a center of an outer end portion of the fixing member.

11. The interlock structure of the power supply system according to claim 10, wherein the first battery has a higher voltage than that of the second battery.

12. The interlock structure of the power supply system according to claim 9, wherein the first battery has a higher voltage than that of the second battery.

13. The interlock structure of the power supply system according to claim 2, wherein the first battery has a higher voltage than that of the second battery.

14. The interlock structure of the power supply system according to claim 1, wherein the first battery has a higher voltage than that of the second battery.

* * * * *